(12) United States Patent
Ding et al.

(10) Patent No.: US 11,176,232 B2
(45) Date of Patent: Nov. 16, 2021

(54) IDENTITY VERIFICATION METHOD AND APPARATUS

(71) Applicant: Advanced New Technologies Co., Ltd., Grand Cayman (KY)

(72) Inventors: Liangzi Ding, Hangzhou (CN); Xiaoguang He, Hanzghou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/200,318

(22) Filed: Nov. 26, 2018

(65) Prior Publication Data

US 2019/0095603 A1 Mar. 28, 2019

Related U.S. Application Data

(63) Continuation of application No. PCT/CN2017/080855, filed on Apr. 18, 2017.

(30) Foreign Application Priority Data

May 27, 2016 (CN) .......................... 201610365906.2

(51) Int. Cl.
*G06F 21/32* (2013.01)
*H04L 9/06* (2006.01)
(Continued)

(52) U.S. Cl.
CPC ............ *G06F 21/32* (2013.01); *G06F 9/4418* (2013.01); *G06F 9/485* (2013.01); *H04L 9/32* (2013.01); *H04L 63/08* (2013.01); *H04W 12/06* (2013.01)

(58) Field of Classification Search
CPC ......... G06F 21/32; G06F 9/4418; G06F 9/485
See application file for complete search history.

(56) References Cited

U.S. PATENT DOCUMENTS 6,728,884 B1 * 4/2004 Lim ..................... H04L 63/0815
709/219
8,457,367 B1 * 6/2013 Sipe ................... G06K 9/00315
382/118
(Continued)

FOREIGN PATENT DOCUMENTS

CN 101753311 6/2010
CN 102404727 4/2012
(Continued)

OTHER PUBLICATIONS

Hu et al ("Hu," Espacenet Translation of CN 103577237 (Year: 2013).*
(Continued)

*Primary Examiner* — Luu T Pham
*Assistant Examiner* — James J Wilcox
(74) *Attorney, Agent, or Firm* — Fish & Richardson P.C.

(57) ABSTRACT

A system detects that a target service program is being executed by a computing device. The target service program is one of a plurality of pre-defined service programs to be suspended to complete an identity verification of a user using the target service program. Execution of the target service program is suspended on the computing device. An identity verification program is executed on the computing device. The identity verification program is configured to perform the identity verification of the user to obtain an identity verification result indicating whether an identity of the user is verified. The identity verification program is independent from the target service program.

14 Claims, 8 Drawing Sheets

Suspend a target service program when it is detected that the target service program is running — 101

Call an identity verification program to perform identity verification, so as to obtain an identity verification result — 102

(51) Int. Cl.
*H04W 12/06* (2021.01)
*H04L 9/32* (2006.01)
*G06F 9/4401* (2018.01)
*G06F 9/48* (2006.01)
*H04L 29/06* (2006.01)

(56) References Cited

U.S. PATENT DOCUMENTS

| | | | | |
|---|---|---|---|---|
| 8,515,490 | B2* | 8/2013 | Moganti | H04L 67/14 455/556.1 |
| 8,590,015 | B2* | 11/2013 | Desplanques | H04W 12/08 726/4 |
| 8,904,498 | B2* | 12/2014 | Tootill | H04W 12/068 726/5 |
| 8,970,348 | B1* | 3/2015 | Evans | G06F 21/32 340/5.83 |
| 9,578,022 | B2* | 2/2017 | Salonen | H04L 63/0861 |
| 9,628,484 | B2* | 4/2017 | Perrone, II | H04L 63/0892 |
| 10,122,710 | B2* | 11/2018 | Tomlinson | H04L 9/3231 |
| 2003/0182626 | A1 | 9/2003 | Davidov et al. | |
| 2006/0059569 | A1* | 3/2006 | Dasgupta | G06F 21/32 726/28 |
| 2009/0083847 | A1 | 3/2009 | Fadell et al. | |
| 2011/0197263 | A1* | 8/2011 | Stinson, III | G06F 3/0484 726/4 |
| 2013/0167212 | A1* | 6/2013 | Azar | G06F 21/32 726/7 |
| 2013/0269013 | A1 | 10/2013 | Parry et al. | |
| 2014/0165178 | A1* | 6/2014 | Perrone, II | H04L 63/0892 726/9 |
| 2014/0283012 | A1 | 9/2014 | Eggerton et al. | |
| 2015/0365515 | A1* | 12/2015 | Chen | G06F 21/31 455/411 |
| 2016/0054803 | A1* | 2/2016 | Poupyrev | G06F 3/017 345/156 |
| 2016/0063230 | A1* | 3/2016 | Alten | H04L 63/0861 726/28 |
| 2016/0132105 | A1* | 5/2016 | Turgeman | G06F 3/017 345/162 |
| 2016/0171806 | A1* | 6/2016 | Van Dyken | G07C 9/37 367/199 |
| 2016/0330178 | A1* | 11/2016 | Sprague | H04L 63/06 |
| 2017/0124328 | A1* | 5/2017 | Krishnapura | G06F 21/57 |
| 2017/0244701 | A1* | 8/2017 | Su | G06F 21/36 |
| 2017/0332236 | A1* | 11/2017 | Li | H04L 63/083 |
| 2019/0026452 | A1* | 1/2019 | Wang | G06F 21/32 |

FOREIGN PATENT DOCUMENTS

| | | | |
|---|---|---|---|
| CN | 103577237 | 2/2014 | |
| CN | 103577237 A * | 2/2014 | G06F 21/32 |
| CN | 104866750 | 8/2015 | |
| CN | 105095746 | 11/2015 | |
| CN | 106445587 | 2/2017 | |
| JP | 2001331451 | 11/2001 | |
| JP | 2007334490 | 12/2007 | |
| JP | 2010257060 | 11/2010 | |
| JP | 2011216043 | 10/2011 | |
| KR | 20130044292 | 5/2013 | |
| TW | 201611644 | 3/2016 | |
| WO | WO 2007015301 | 2/2007 | |

OTHER PUBLICATIONS

Fong et al "A Biometric Authentication Model Using Hand Gesture Images," BioMedical Engineering Online, pp. 1-18 (Year: 2013).*
International Search Report by the International Searching Authority issued in International Application No. PCT/CN2017/080855 dated Jul. 13, 2017; 10 pages.
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
European Extended Search Report in European Application No. 17802002.0, dated Apr. 4, 2019, 8 pages.

* cited by examiner

IDENTITY VERIFICATION METHOD AND APPARATUS

CROSS-REFERENCE TO RELATED APPLICATIONS

This application is a continuation of PCT Application No. PCT/CN2017/080855, filed on Apr. 18, 2017, which claims priority to Chinese Patent Application No. 201610365906.2, filed on May 27, 2016, and each application is hereby incorporated by reference in its entirety.

TECHNICAL FIELD

The present invention relates to information technologies, and in particular, to an identity verification method and apparatus.

BACKGROUND

Identity verification is usually used to verify a user's identity when the user opens client software or enters the client software to perform a specific service operation, so as to improve service security. In existing technologies, identity verifications such as entering passcode by gesture are implemented by identity verification logic code embedded in service logic code included in client software that performs the identity verification.

However, because the coupling degree between identity verification logic code and service logic code is relatively high, if identity verification needs to be performed in different service scenarios, same identity verification logic code needs to be embedded in all service logic code. Therefore, it is inconvenient to perform operations of maintaining identity verification logic.

SUMMARY

The present invention provides an identity verification method and apparatus, to resolve a technical problem in the existing technology that it is inconvenient to perform operations of maintaining identity verification logic.

To achieve the previous objective, the following technical solutions are used in the implementations of the present invention.

A first aspect provides an identity verification method, including: suspending a target service program when it is detected that the target service program is running; and calling an identity verification program to perform identity verification, so as to obtain an identity verification result, where the identity verification program and the target service program are independent of each other.

A second aspect provides an identity verification apparatus, including: a suspension module, configured to suspend a target service program when it is detected that the target service program is running; and a verification module, configured to call an identity verification program to perform identity verification, so as to obtain an identity verification result, where the identity verification program and the target service program are independent of each other.

In the identity verification method and apparatus provided in the implementations of the present invention, when it is detected that the target service program is running, the on-going target service program is suspended, and the identity verification program is performed. In addition, the service program and the identity verification program are independent of each other, that is, the coupling degree between the service program and the identity verification program is relatively low. When identity verification needs to be performed on service programs in different service scenarios, one identity verification program can be used to complete an identity verification process through detection on the plurality of service programs, thereby resolving a technical problem of inconvenient maintenance of the identity verification program.

The previous descriptions are merely an overview of the technical solutions of the present invention. For better understanding of the technical means of the present invention, the previous descriptions can be implemented based on content of the specification; and to make the previous and other objectives, features, and advantages of the present invention more comprehensible, implementations of the present invention are described as follows.

BRIEF DESCRIPTION OF DRAWINGS

It becomes clear for persons skilled in the art to learn various other advantages and benefits by reading detailed description of the following preferred implementations. Accompanying drawings are merely used for showing the preferred implementations, but not considered as a limitation on the present invention. In all accompanying drawings, a same reference symbol is used to indicate a same part. In the accompanying drawings.

DESCRIPTION OF IMPLEMENTATIONS

Implementations of the present disclosure that are used as examples are described in more detail with reference to the accompanying drawings. Although the accompanying drawings show the implementations of the present disclosure that are used as examples, it should be understood that the present disclosure can be implemented in various forms, and shall not be limited by the implementations described here. On the contrary, these implementations are provided for clearer understanding of the present disclosure, and to completely convey the scope of the present disclosure to the person skilled in the art.

An identity verification method and apparatus provided in the implementations of the present invention are described in detail with reference to the accompanying drawings.

Implementation 1

Figure 1:
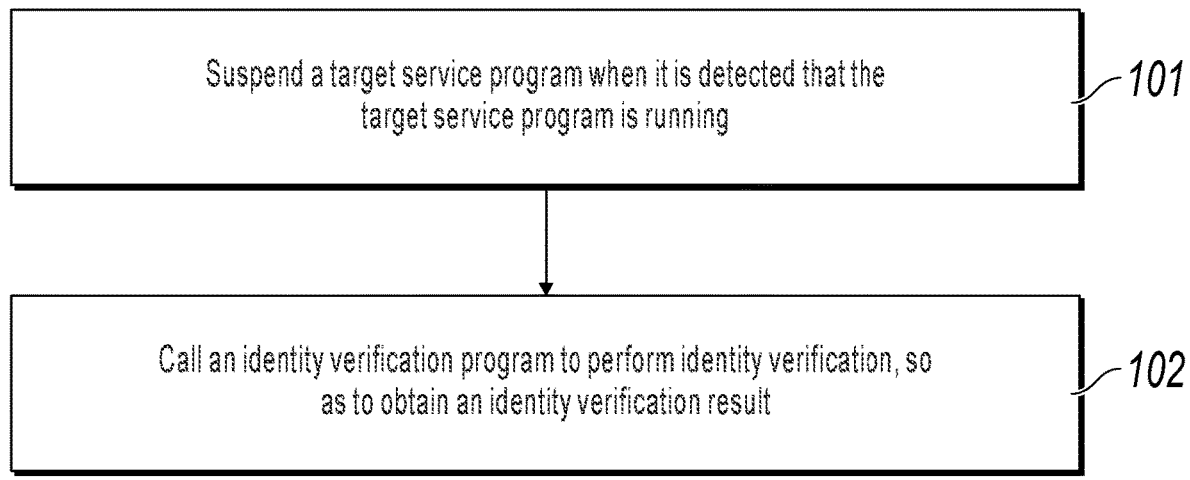
FIG. 1 is a schematic flowchart illustrating an identity verification method, according to Implementation 1 of the present invention.

FIG. 1 is a schematic flowchart illustrating an identity verification method, according to Implementation 1 of the present invention. A terminal device such as a mobile phone usually has one or more services, and implementation of each service depends on at least one service program. For ease of description, in the following implementations, a service program of a service currently operated by a user is referred to as a target service program.

It should be noted that each service program mentioned here can be an independent application, or can be an application formed by various service programs, and is not limited in this implementation.

The method provided in this implementation can be performed by a control program different from the target service program discussed in the following description. The control program runs on said terminal device. The program for performing this method is used for identity verification of a user when the user starts to operate on a target service but has not yet obtained service-related information, thereby ensuring information security of the service-related information.

As shown in FIG. 1, the identity verification method includes the following steps.

Step 101: Suspend the target service program when it is detected that the target service program is running.

Specifically, a target function used to display a service interface, for example, a startAPP method function, indicates that the service program is running a target process used for processing the service interface. Therefore, all service programs that are running the target process can be determined by detecting a service program that calls the target function. When a service program is running the target process, it indicates that a target program starts to run. In implementation, the program for performing the method in this implementation can specifically detect a call interface of the target function, to learn of a service program that calls the target function.

In a possible implementation, identity verification can be performed on a service with a relatively high security requirement, instead of performing identity verification on all services. Therefore, a target process on which identity verification needs to be performed can be determined in advance from all the services. After a service program that runs the target process is detected, it needs to be further determined whether the detected service program is a target process on which identity verification needs to be performed. Only when the service program is the target service program, the on-going service program is suspended.

When it is detected that the target service program runs the target process, the target service program is suspended, to suspend the on-going target service program. Because the on-going target service is suspended when it is detected that the target service program starts to run the target process for displaying the service interface, a running result of the target process, that is, display-related information of the service interface, has not been generated yet. Therefore, the service interface is not displayed on a terminal device of the user.

Step 102: Call an identity verification program to perform identity verification, so as to obtain an identity verification result.

The identity verification program and the target service program are independent of each other. Independence described here means that there is no interface such as a call interface between the two programs.

Specifically, after the on-going target service program is suspended, the identity verification program is performed, so as to obtain the identity verification result.

Figure 2:
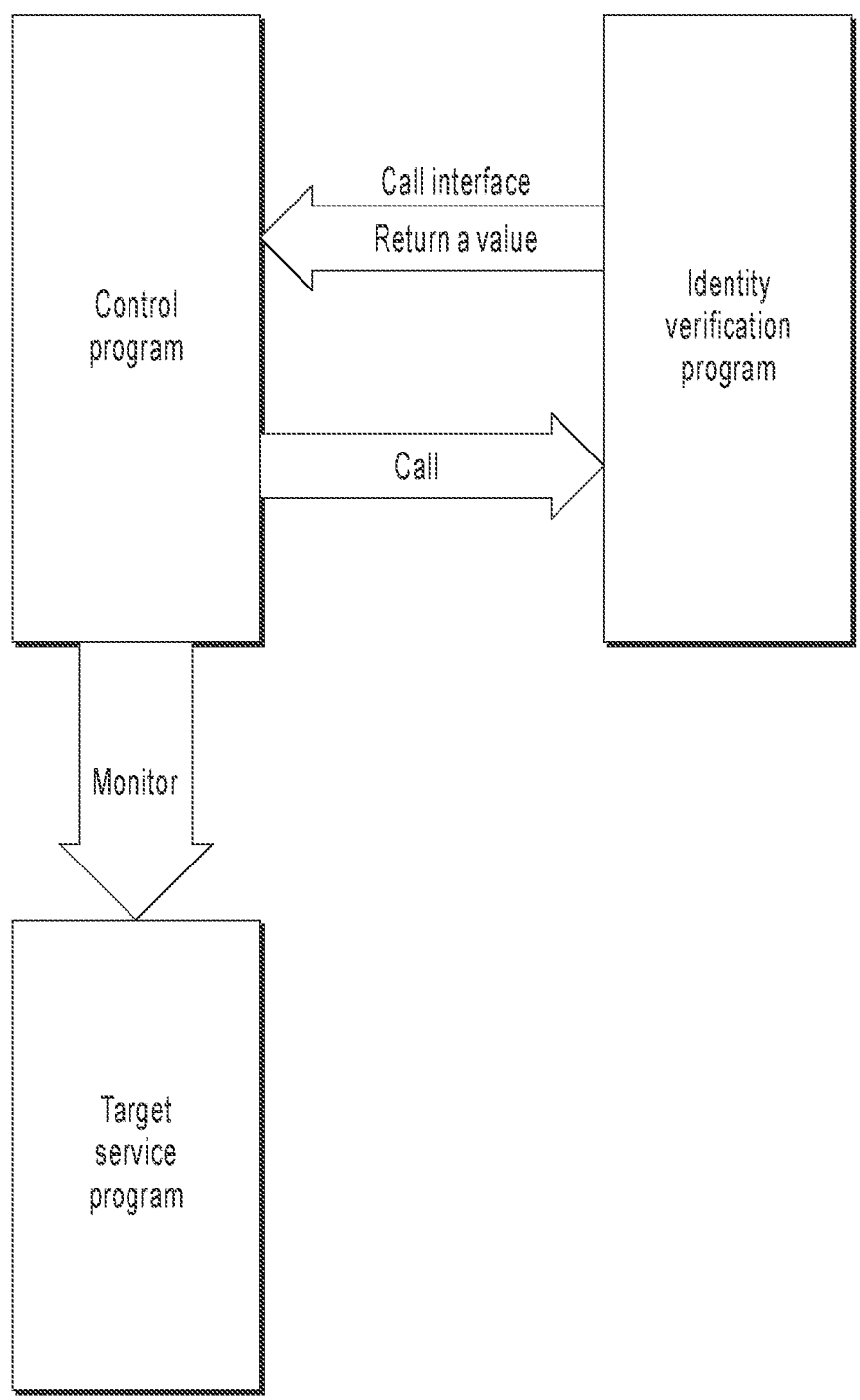
FIG. 2 is a schematic diagram illustrating a control program.

In a possible implementation, the control program for performing the method provided in this implementation cannot implement an identity verification function. Therefore, after suspending the on-going target service program, the control program for performing the method provided in this implementation calls the identity verification program that can implement the identity verification function, and the identity verification program returns the identity verification result. FIG. 2 is a schematic diagram illustrating a control program. As shown in FIG. 2, when detecting that the target service program is running, the control program for performing this method suspends the target service program, and the control program performs identity verification on the user by calling the identity verification program, to ensure information security of service-related information.

Figure 3:
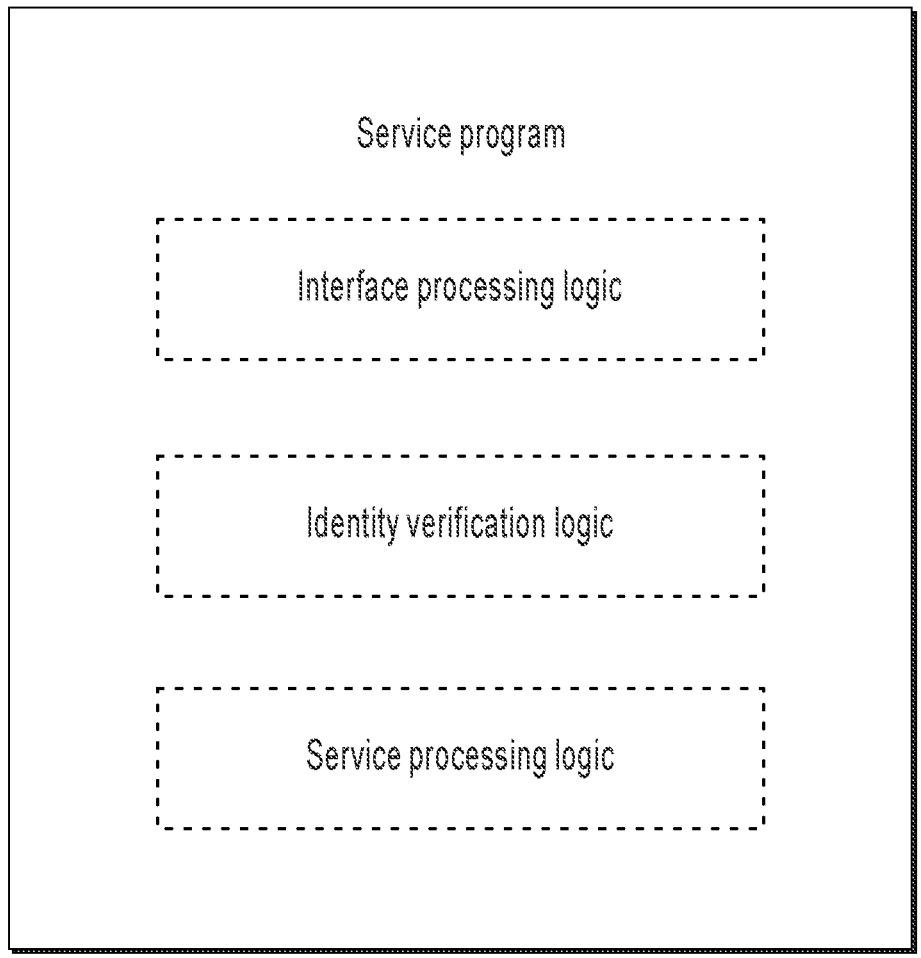
FIG. 3 is a first schematic diagram illustrating an identity verification method in the existing technology.

It can be seen that, in this implementation, separation between the identity verification program and the service program is implemented, and the identity verification program and the service program are independent of each other. Compared with a method shown in FIG. 3 that identity verification logic is embedded into a service program, in the method provided in this implementation, the coupling degree between the identity verification program and the service program is reduced. In FIG. 3, in a programming phase of the service program, it needs to determine whether identity verification needs to be performed on the service program, interface processing logic, identity verification logic, and service processing logic that are needed by the service program are integrated into the service program, and the identity verification logic needs to be repeatedly written into different service programs when identity verification needs to be performed on service programs in different service scenarios. However, in the method provided in this implementation, when it is detected that the target service program is running, an on-going target service program is suspended, and the identity verification program is performed. In addition, the service program and the identity verification program are independent of each other. When identity verification needs to be performed on service programs in different service scenarios, one identity verification program can be used to complete an identity verification process through detection on the plurality of service programs, thereby resolving a technical problem of inconvenient maintenance of the identity verification program.

Figure 4:
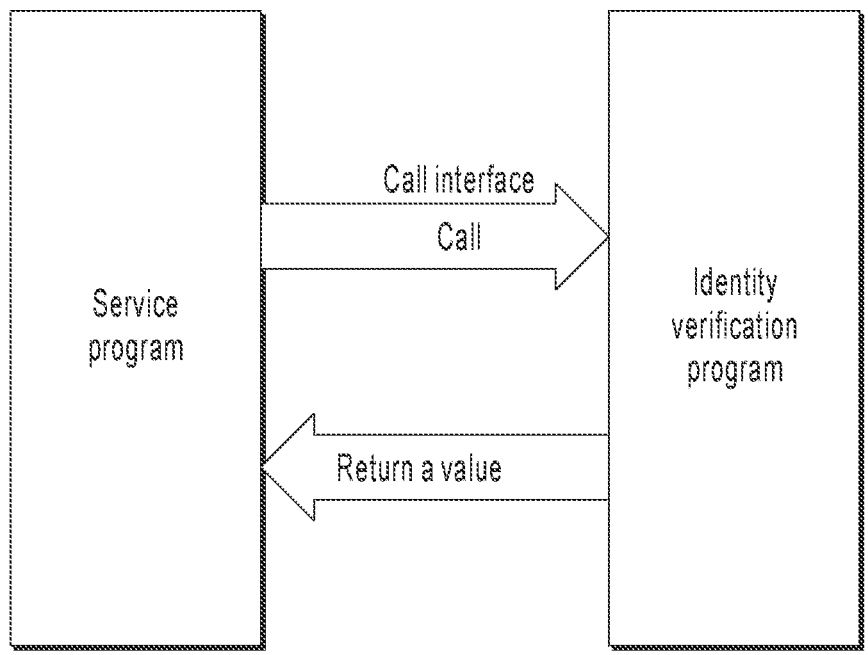
FIG. 4 is a second schematic diagram illustrating an identity verification method in the existing technology.

In addition, an interface between the identity verification program and the service program is eliminated in comparison with the program calling method shown in FIG. 4. As shown in FIG. 4, a service program calls an identity verification program by using a call interface between the service program and the identity verification program. Compared with said method, in the method provided in the present implementation, because the interface between the identity verification program and the service program is eliminated, a process of determining, in the programming phase, whether identity verification needs to be performed on the service program, and reserving a call interface for calling the identity verification program is not needed. As such, the identity verification program and the service program are truly independent.

Based on the identity verification method disclosed in the present implementation, a person skilled in the art can implement identity verification of the user by using various identity verification forms. For example, identity verification can be performed by using at least one of gesture, fingerprint, and character password. The identity verification form is not limited in this implementation.

Further, before identity verification is performed, characteristic information of the target process in the target service program can be identified based on a calling request used by the target service program to call the target function. The calling request includes an identifier of the target service program, an identifier of the service interface processed by the target process, and/or a network address included in the service interface processed by the target process.

Match a policy in a policy set based on the characteristic information. If a matched policy exists in the policy set, identity verification is performed.

Further, after identity verification is performed, if the identity verification result is that the identity verification is successful, the target service program resumes to run.

Specifically, whether to resume the target service program is determined based on the identity verification result. If the identity verification result is that the identity verification is successful, the target service program resumes. If the identity verification result is that the identity verification fails, the service program is quit.

This is because if identity verification fails, it indicates that an identity of a user who currently operates the service program is insecure, and needs to be further verified. Therefore, to protect user data, all service programs that are currently being operated by the user are forced to quit to avoid data leakage.

Implementation 2

Figure 5:
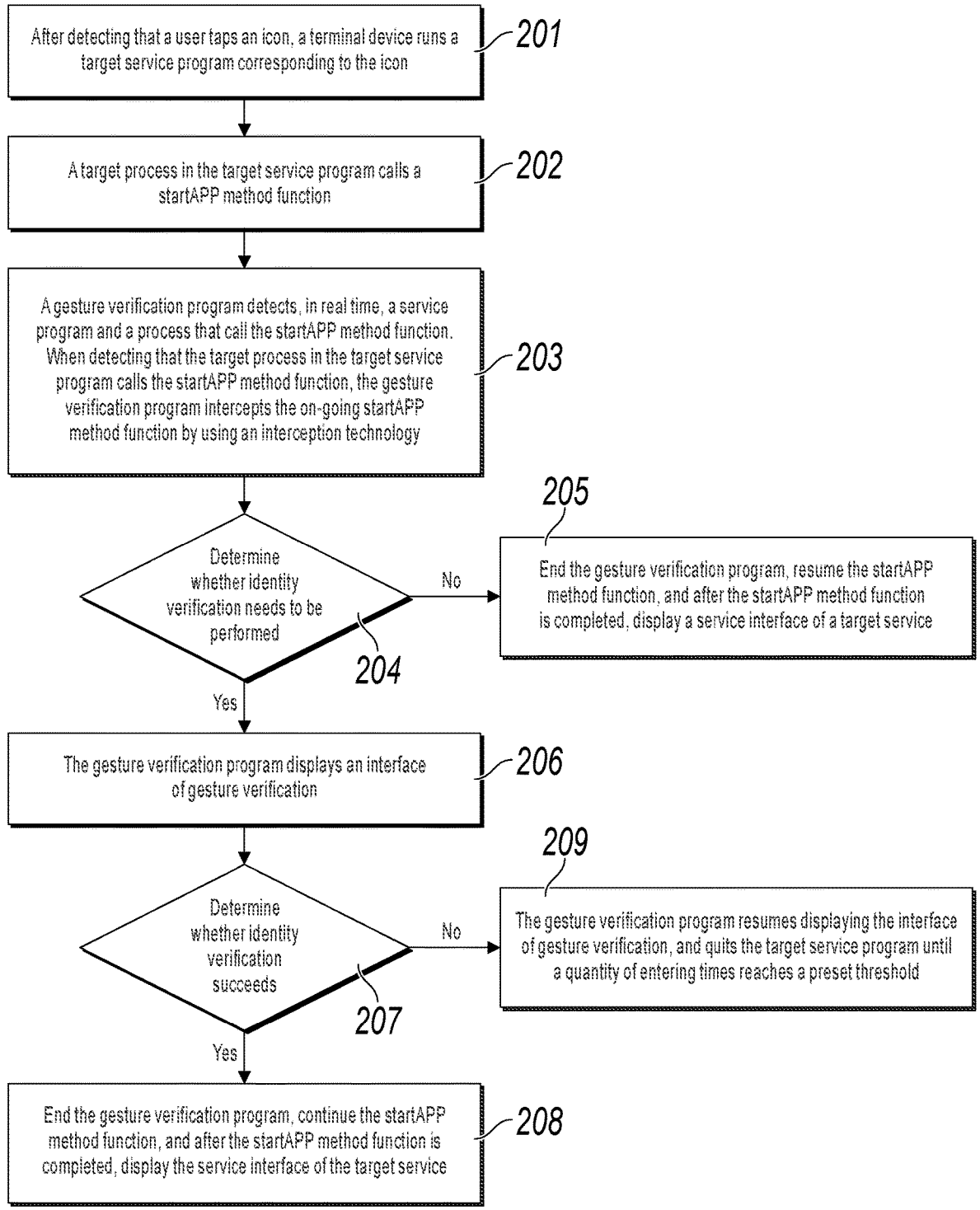
FIG. 5 is a schematic flowchart illustrating an identity verification method, according to Implementation 2 of the present invention.

FIG. 5 is a schematic flowchart illustrating an identity verification method, according to Implementation 2 of the present invention. In this implementation, an ALIPAY application is used as an example to describe in detail the identity verification method. The ALIPAY application includes different services, for example, Pay, YU'E Bao, KOUBEI, Red Envelope, and ANT FORTUNE. Because a payment service relates to financial security of a user, identity verification needs to be performed on a user during an operation of a payment service. Here, a program used for implementing a payment service is referred to as a target service program, and a process used for processing a payment service interface is referred to as a target process. The method includes the following steps.

Step 201: After detecting that a user taps an icon, a terminal device runs a target service program corresponding to the icon.

When it is detected that the user taps an icon of a payment service in an ALIPAY interface, it is determined that the user needs to enable the payment service and perform an operation on the payment service.

Step 202: A target process in the target service program calls a startAPP method function.

The startAPP method function is used to process a service interface of each service. Therefore, before the service interface of each service is displayed, the startAPP method function needs to be called. The services that perform the step of displaying the service interface are determined based on the calling status the startAPP method function by the program.

For example, in the ALIPAY application, after each service program is started, the startAPP method function needs to be called before a service interface is displayed. Therefore, the startAPP method function can be detected, to determine a service program that is running but is not displayed on a service interface.

Step 203: A gesture verification program detects, in real time, a service program and a process that call the startAPP method function. When detecting that the target process in the target service program calls the startAPP method function, the gesture verification program intercepts the on-going startAPP method function by using an interception technology.

Before displaying a service interface, the service program needs to write content that needs to be displayed in the service interface into a request for calling the startAPP method function, so as to provide the content that needs to be displayed and related information of the service program for the startAPP method function. As such, the startAPP method function processes the service interface based on the content that needs to be displayed, and returns a processing result to the service program, and the service program performs the step of displaying.

Therefore, after detecting the service program and the process that call the startAPP method function, the gesture verification program can obtain the related information of the service program from the request for calling the startAPP method function, that is, an identifier of the service program and an identifier of the service interface processed by the process, and identify whether a network address is included in the content that needs to be displayed in the service interface. If the network address is included, the network address included in the service interface can be further obtained.

Step 204: The gesture verification program matches the target process in the target service program with a policy in a policy set, to determine whether identity verification needs to be performed; and if there is no matched policy, step 205 is performed; or if there is a matched policy, step 206 is performed.

The policy set includes different policies, where each policy records an identifier of a service program, and can further include an identifier of a service interface processed by a process and/or a network address included in the service interface.

The policy records the identifier of the service program. This is because identity verification needs to be performed only on some services, instead of on all services in an application. For example, identity verification needs to be performed on YU'E BAO and the payment service in ALIPAY, but does not need to be performed on KOUBEI. Therefore, the policy set can be preconfigured based on characteristic information of a service program on which identity verification needs to be performed, and/or characteristic information of a process on which identity verification needs to be performed.

The policy records the identifier of the service interface. This is because one service program can include more than one service interface, and identity verification needs to be performed only when a user needs to display a specific service interface. Therefore, a corresponding identifier of the specific service interface is added to the policy.

In addition, the policy records the network address included in the service interface. This is because only when the service interfaces display a network address that links to a page including user information, identity verification needs to be performed on a user before some service interfaces are displayed. If the service interface does not include the network address that links to the page including the user information, identity verification does not need to be performed on the user.

Step 205: If there is no matched policy, it indicates that identity verification does not need to be performed for that service. Thus, the gesture verification program is ended, the startAPP method function resumes, and after the startAPP method function is completed, a service interface of a target service is displayed.

Step 206: If there is a matched policy, it indicates that identity verification needs to be performed on a service, and the gesture verification program displays an interface of gesture verification.

The gesture verification program implements identity verification by calling a specific identity verification program or function.

Step 207: The gesture verification program determines, based on a gesture pattern entered by a user, whether identity verification succeeds, and if identity verification succeeds, step 208 is performed; otherwise, step 209 is performed.

A standard gesture pattern is pre-stored in the gesture verification program, and the gesture pattern entered by the user is compared with the standard gesture pattern. If the gesture pattern entered by the user is the same as the standard gesture pattern, it is determined that identity verification succeeds; otherwise, identity verification fails.

Step 208: End the gesture verification program, resume the startAPP method function, and after the startAPP method function is completed, display the service interface of the target service.

Step 209: The gesture verification program resumes displaying the interface of gesture verification, and quits the target service program until the number of gesture patterns entered reaches a preset threshold.

Each currently running service programs in an application that includes the target service program can be forcibly quit when the target service program is quit, so as to enhance security of user information.

Implementation 3

Figure 6:
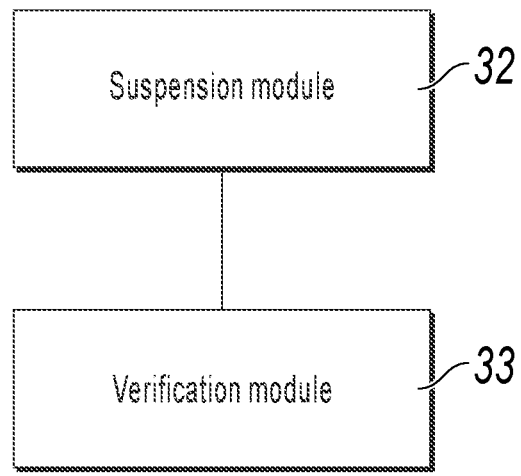
FIG. 6 is a schematic structural diagram illustrating an identity verification apparatus, according to Implementation 3 of the present invention.

FIG. 6 is a schematic structural diagram illustrating an identity verification apparatus, according to Implementation 3 of the present invention. As shown in FIG. 6, the apparatus includes a suspension module 32 and a verification module 33.

The suspension module 32 is configured to suspend a target service program when it is detected that the target service program is running.

The verification module 33 is configured to call an identity verification program to perform identity verification, so as to obtain an identity verification result.

The identity verification program and the target service program are independent of each other. The identity verification program is configured to perform identity verification by using at least one of a gesture, a fingerprint, and a character password.

In the identity verification apparatus provided in this implementation, when it is detected that the target service program is running, the suspension module 32 suspends the on-going target service program, and the verification module 33 performs an identity verification step. In addition, the service program and the identity verification program are independent of each other, that is, the coupling degree between the service program and the identity verification program is relatively low. When identity verification needs to be performed on service programs in different service scenarios, one identity verification program can be used to complete an identity verification process through detection on the plurality of service programs, thereby resolving a technical problem of inconvenient maintenance of the identity verification program.

Implementation 4

Figure 7:
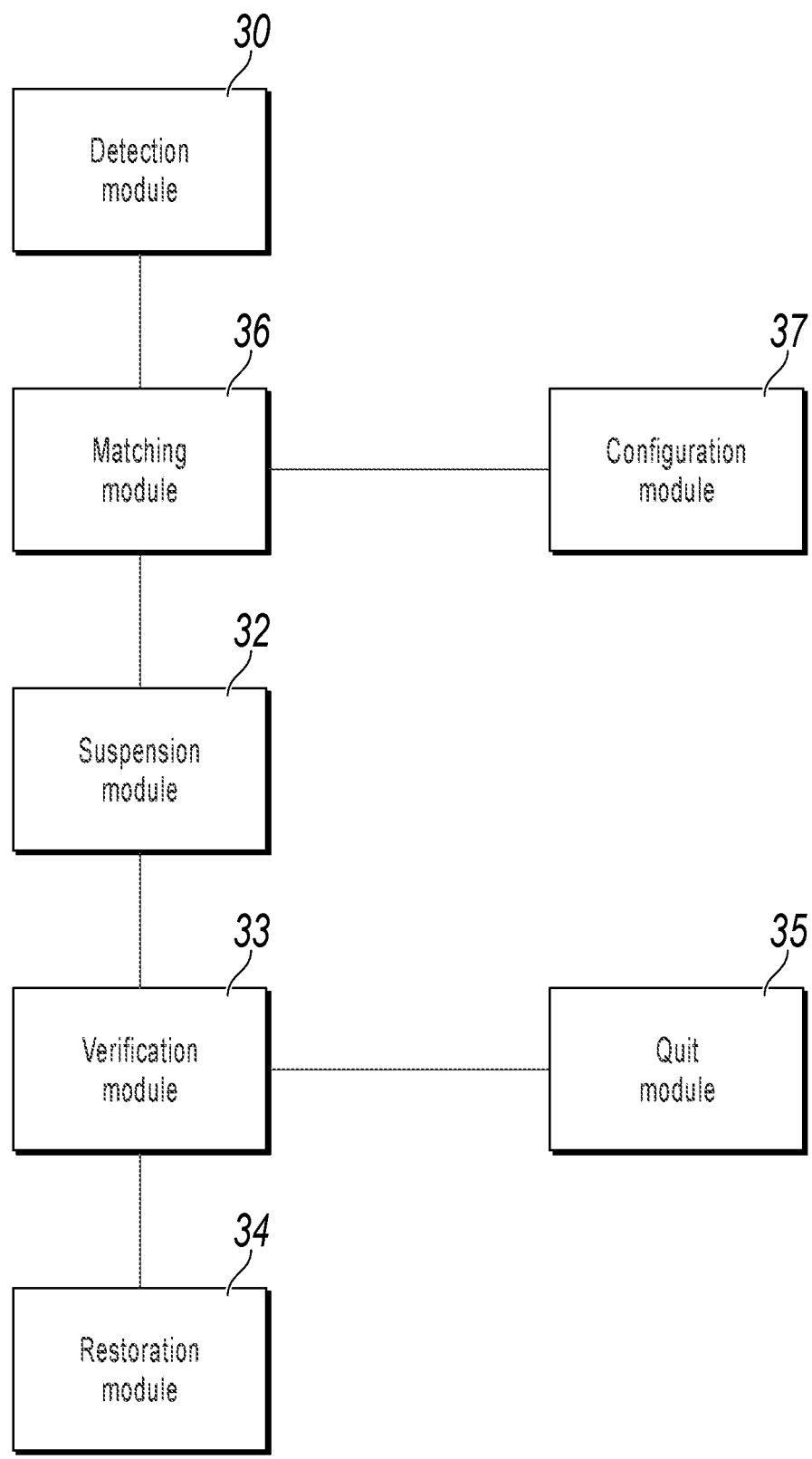
FIG. 7 is a schematic structural diagram illustrating another identity verification apparatus, according to Implementation 4 of the present invention.

FIG. 7 is a schematic structural diagram illustrating another identity verification apparatus, according to Implementation 4 of the present invention. As shown in FIG. 7, on the basis of the identity verification apparatus provided in FIG. 6, the identity verification apparatus further includes a detection module 30.

The detection module 30 is configured to detect a service program that runs a target process.

The suspension module 32 is configured to suspend the target service program when it is detected that the target service program runs the target process.

The target process is used to process a service interface, and the target process includes calling of a target function. The target function is used to display the service interface, and in specific implementation, the target function can be a startAPP method function.

Further, the identity verification apparatus includes a restoration module 34, a quit module 35, a matching module 36, and a configuration module 37.

The restoration module 34 is configured to resume the target service program, if the identity verification result is that identity verification succeeds, The quit module 35 is configured to quit the service program if the identity verification result is that identity verification fails.

The matching module 36 is configured to match a preset policy set with characteristic information of the target service program, and/or characteristic information of a process run by the target service program.

Based on above step, the suspension module 32 is specifically configured to determine that a matched policy exists in the policy set before suspending the on-going target service program.

The configuration module 37 is configured to configure the policy set based on characteristic information of a service program on which identity verification needs to be performed, and/or characteristic information of a process on which identity verification needs to be performed.

The characteristic information includes an identifier of the target service program, an identifier of the service interface processed by the target process, and/or a network address included in the service interface processed by the target process.

A person of ordinary skill in the art can understand that all or some of the steps of the method implementations can be implemented by a program instructing relevant hardware. The program can be stored in a computer-readable storage medium. When the program runs, the steps of the method implementations are performed. The previous storage medium includes any medium that can store program code, such as a ROM, a RAM, a magnetic disk, or an optical disc.

Finally, it should be noted that the previous implementations are merely intended for describing the technical solutions of the present invention, but not for limiting the present invention. Although the present invention is described in detail with reference to the previous implementations, A person of ordinary skill in the art should understand that modifications can still be made to the technical solutions described in the previous implementations or make equivalent replacements to some or all technical features thereof, without departing from the scope of the technical solutions of the implementations of the present invention.

Figure 8:
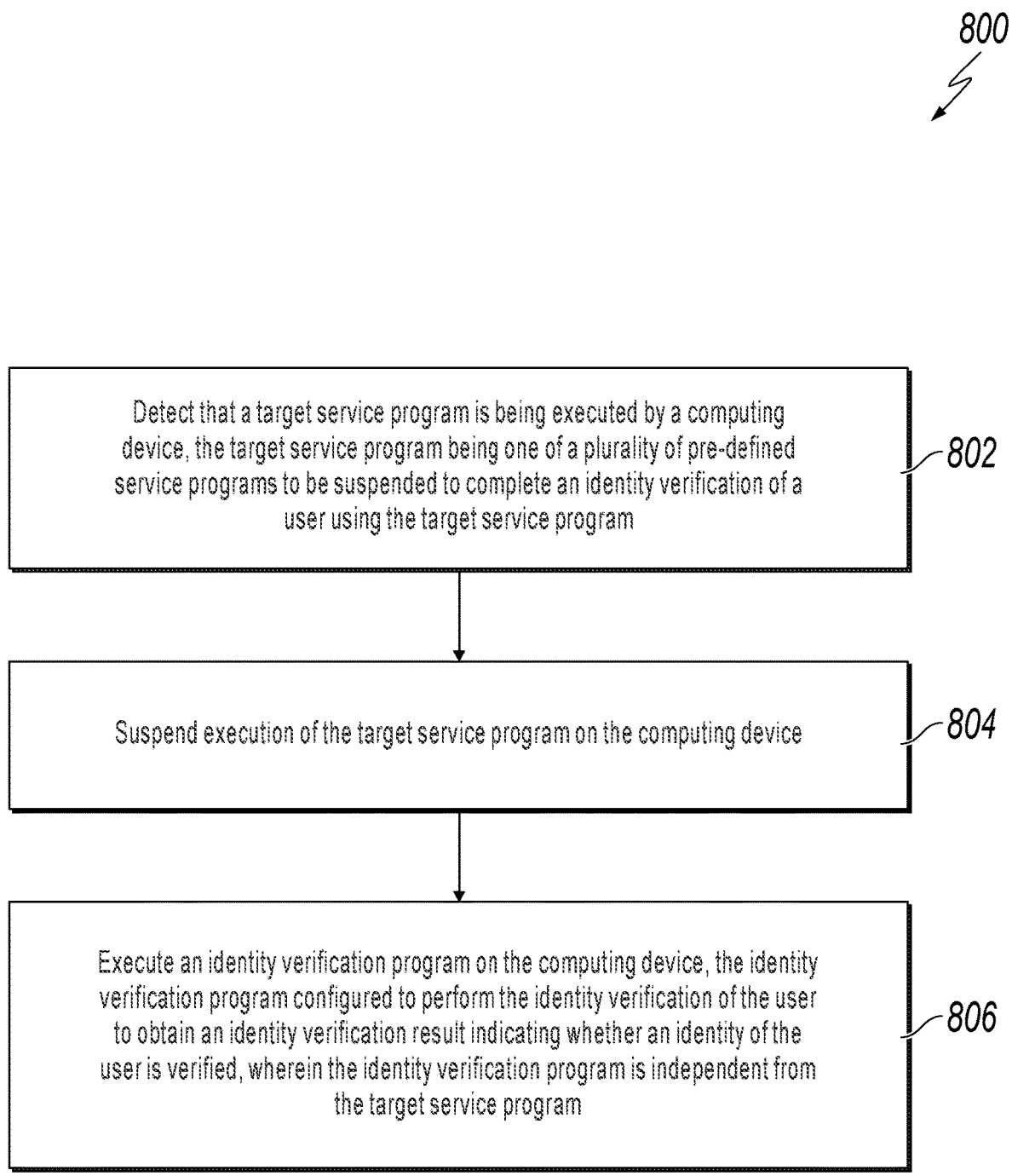
FIG. 8 is a flowchart illustrating an example of a computer-implemented method for executing an identity verification program during completion of an identity verification of a user using a target service program, according to an implementation of the present disclosure.

FIG. 8 is a flowchart illustrating an example of a computer-implemented method 800 for executing an identity verification program during completion of an identity verification of a user using a target service program, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a detection is made that that a target service program is being executed by a computing device. The target service program is one of a plurality of pre-defined service programs to be suspended to complete an identity verification of a user using the target service program. For example, the target service program can be Program X running on a user's mobile device. From 802, method 800 proceeds to 804.

In some implementations, detecting that the target service program is executing can include determining if a particular target process is executing. For example, the detection module 30 can detect that Program X is executing a target process (for example, Target Process Y) associated with a service interface. The target service detection module can then determine that the target process (for example, Target Process Y) is one of a plurality of pre-defined target processes to be used to identify target service programs to be suspended. This determination can be used as a proxy that the target service program (for example, Program X) is executing.

In some implementations, the target process can call a target function used to display the service interface. For example, the target function (for example, Target Function Z) can be one of a plurality of pre-defined target functions that are used to identify corresponding target service programs to be suspended.

At 804, execution of the target service program is suspended on the computing device. For example, the suspension module 32 can suspend execution of the program executing on the user's mobile device. From 804, method 800 proceeds to 806.

In some implementations, suspending execution of the target service program can be based on a set of pre-defined suspension policies. For example, the suspension module 32 can determine if a match exists between a pre-defined policy set and at least one of characteristic information of the target service program and characteristic information of the target process run by the target service program. The suspension module 32 can then suspend execution of the target service program when a determination is made that the match exists.

At 806, an identity verification program is executed on the computing device. The identity verification program can be configured to perform the identity verification of the user to obtain an identity verification result indicating whether an identity of the user is verified. For example, the identity verification of the user includes verifying at least one of a gesture of the user, a fingerprint of the user, and a password of the user. The identity verification program can typically be independent from the target service program. For example, the identity verification program is not part of Program X. After 806, method 800 stops.

In some implementations, method 800 can further include steps for resuming the target service program. For example, the verification module 33 can determine that the identity verification result indicates that the identity of the user is verified. In response to determining that the identity verification result indicates that the identity of the user is verified, the verification module 33 can resume the target service program.

In some implementations, method 800 can further include steps that occur when the user is not verified. For example, the verification module 33 can determine that the identity verification result indicates that the identity of the user is not verified. In response to determining that the identity verification result indicates that the identity of the user is not verified, the verification module 33 can terminate the target service program.

In some implementations, method 800 can further include pre-configuring the policy set based on the characteristic information of the target service program and the characteristic information of the process. For example, the characteristic information includes one or more of an identifier of the target service program, an identifier of the target process, an identifier of the service interface, and a network address of the service interface.

In some implementations, method 800 can further include determining other service programs that are currently in use by the user. If other programs are currently in use by the user, then the suspension module 32 can suspend the other service programs.

Techniques described in the present disclosure can reduce a degree of coupling between an identity verification program and service programs being used by users. For example, in conventional techniques, to determine whether identity verification needs to be performed on the service program, the service program itself needs to include interface processing logic, identity verification logic, and service processing logic to verify a user's identity. In some implementations, the identity verification program is independent from a target service program. In this way, one identity verification program can be used to complete an identity verification process through detection of the plurality of service programs. Having a central identity verification program can resolve maintenance issues associated with maintaining multiple identity verification program instances. Further, all service programs that are currently being operated by the user can be forced to quit.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:
1. A computer-implemented method, comprising:
  detecting, by a control program, execution of a target service program by a computing device that is one of a plurality of pre-defined service programs to be sus- pended to complete an identity verification of a user using the target service program;
pre-configuring a pre-defined policy set based on characteristic information of the target service program and characteristic information of a target process executed by the target service program;
suspending, by the control program, execution of the target service program on the computing device, wherein suspending execution of the target service program comprises:
  determining that a match exists between the pre-defined policy set and at least one of the characteristic information of the target service program and of the target process executed by the target service program, wherein the characteristic information includes one or more of an identifier of the target service program, an identifier of the target process, an identifier of a service interface, and a network address of the service interface, and
  suspending execution of the target service program when a determination is made that the match exists;
determining, by the control program, that identity verification needs to be performed;
in response to determining that identity verification needs to be performed, executing, on the computing device, an identity verification program that is independent from the target service program, wherein executing the identity verification program comprises:
  displaying, on the computing device, an interface of gesture verification,
  receiving a gesture pattern entered by the user,
  comparing, by the identity verification program, the gesture pattern entered by the user to a pre-stored gesture pattern, and
  determining, based upon the gesture pattern entered by the user being the same as the pre-stored gesture pattern, an identity verification result of an identity of the user; and
in response to determining that the identity verification result indicates that the identity of the user is verified, resuming, by the control program, execution of the target service program.

2. The computer-implemented method of claim 1, wherein detecting that the target service program is executing comprises:
  detecting that the target service program is executing the target process associated with the service interface; and
  determining that the target process is one of a plurality of pre-defined target processes to be used to identify target service programs to be suspended.

3. The computer-implemented method of claim 2, wherein the target process calls a target function used to display the service interface, and wherein the target function is one of a plurality of pre-defined target functions to be used to identify corresponding target service programs to be suspended.

4. The computer-implemented method of claim 1, further comprising:
  determining that the identity verification result indicates that the identity of the user is not verified; and
  in response to determining that the identity verification result indicates that the identity of the user is not verified, terminating, by the control program, the target service program.

5. The computer-implemented method of claim 1, wherein the identity verification of the user includes verifying at least one of a gesture of the user, a fingerprint of the user, and a password of the user.

6. The computer-implemented method of claim 1, further comprising:
  determining other service programs that are currently in use by the user; and
  suspending the other service programs.

7. A non-transitory, computer-readable medium storing one or more instructions that, when executed by a computer system, cause the computer system to perform operations comprising:
  detecting, by a control program, execution of a target service program by a computing device that is one of a plurality of pre-defined service programs to be suspended to complete an identity verification of a user using the target service program;
  pre-configuring a pre-defined policy set based on characteristic information of the target service program and characteristic information of a target process executed by the target service program;
  suspending, by the control program, execution of the target service program on the computing device, wherein suspending execution of the target service program comprises:
    determining that a match exists between the pre-defined policy set and at least one of the characteristic information of the target service program and of the target process executed by the target service program, wherein the characteristic information includes one or more of an identifier of the target service program, an identifier of the target process, an identifier of a service interface, and a network address of the service interface, and
    suspending execution of the target service program when a determination is made that the match exists;
  determining, by the control program, that identity verification needs to be performed;
  in response to determining that identity verification needs to be performed, executing, on the computing device, an identity verification program that is independent from the target service program, wherein executing the identity verification program comprises:
    displaying, on the computing device, an interface of gesture verification,
    receiving a gesture pattern entered by the user,
    comparing, by the identity verification program, the gesture pattern entered by the user to a pre-stored gesture pattern, and
    determining, based upon the gesture pattern entered by the user being the same as the pre-stored gesture pattern, an identity verification result of an identity of the user; and
  in response to determining that the identity verification result indicates that the identity of the user is verified, resuming, by the control program, execution of the target service program.

8. The non-transitory, computer-readable medium of claim 7, wherein detecting that the target service program is executing comprises:
  detecting that the target service program is executing the target process associated with the service interface; and
  determining that the target process is one of a plurality of pre-defined target processes to be used to identify target service programs to be suspended.

9. The non-transitory, computer-readable medium of claim 8, wherein the target process calls a target function used to display the service interface, and wherein the target function is one of a plurality of pre-defined target functions to be used to identify corresponding target service programs to be suspended.

10. The non-transitory, computer-readable medium of claim 7, the operations further comprising:
   determining that the identity verification result indicates that the identity of the user is not verified; and
   in response to determining that the identity verification result indicates that the identity of the user is not verified, terminating, by the control program, the target service program.

11. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
   detecting, by a control program, execution of a target service program by a computing device that is one of a plurality of pre-defined service programs to be suspended to complete an identity verification of a user using the target service program;
   pre-configuring a pre-defined policy set based on characteristic information of the target service program and characteristic information of a target process executed by the target service program;
   suspending, by the control program, execution of the target service program on the computing device, wherein suspending execution of the target service program comprises:
      determining that a match exists between the pre-defined policy set and at least one of the characteristic information of the target service program and of the target process executed by the target service program, wherein the characteristic information includes one or more of an identifier of the target service program, an identifier of the target process, an identifier of a service interface, and a network address of the service interface, and
      suspending execution of the target service program when a determination is made that the match exists;
   determining, by the control program, that identity verification needs to be performed;
   in response to determining that identity verification needs to be performed, executing, on the computing device, an identity verification program that is independent from the target service program, wherein executing the identity verification program comprises:
      displaying, on the computing device, an interface of gesture verification,
      receiving a gesture pattern entered by the user,
      comparing, by the identity verification program, the gesture pattern entered by the user to a pre-stored gesture pattern, and
      determining, based upon the gesture pattern entered by the user being the same as the pre-stored gesture pattern, an identity verification result of an identity of the user; and
   in response to determining that the identity verification result indicates that the identity of the user is verified, resuming, by the control program, execution of the target service program.

12. The computer-implemented system of claim 11, wherein detecting that the target service program is executing comprises:
   detecting that the target service program is executing the target process associated with the service interface; and
   determining that the target process is one of a plurality of pre-defined target processes to be used to identify target service programs to be suspended.

13. The computer-implemented system of claim 12, wherein the target process calls a target function used to display the service interface, and wherein the target function is one of a plurality of pre-defined target functions to be used to identify corresponding target service programs to be suspended.

14. The computer-implemented system of claim 11, the operations further comprising:
   determining that the identity verification result indicates that the identity of the user is not verified; and
   in response to determining that the identity verification result indicates that the identity of the user is not verified, terminating, by the control program, the target service program.

* * * * *